(No Model.)
W. P. LANE.
PROCESS OF MANUFACTURING GAS.
No. 356,720. Patented Jan. 25, 1887.
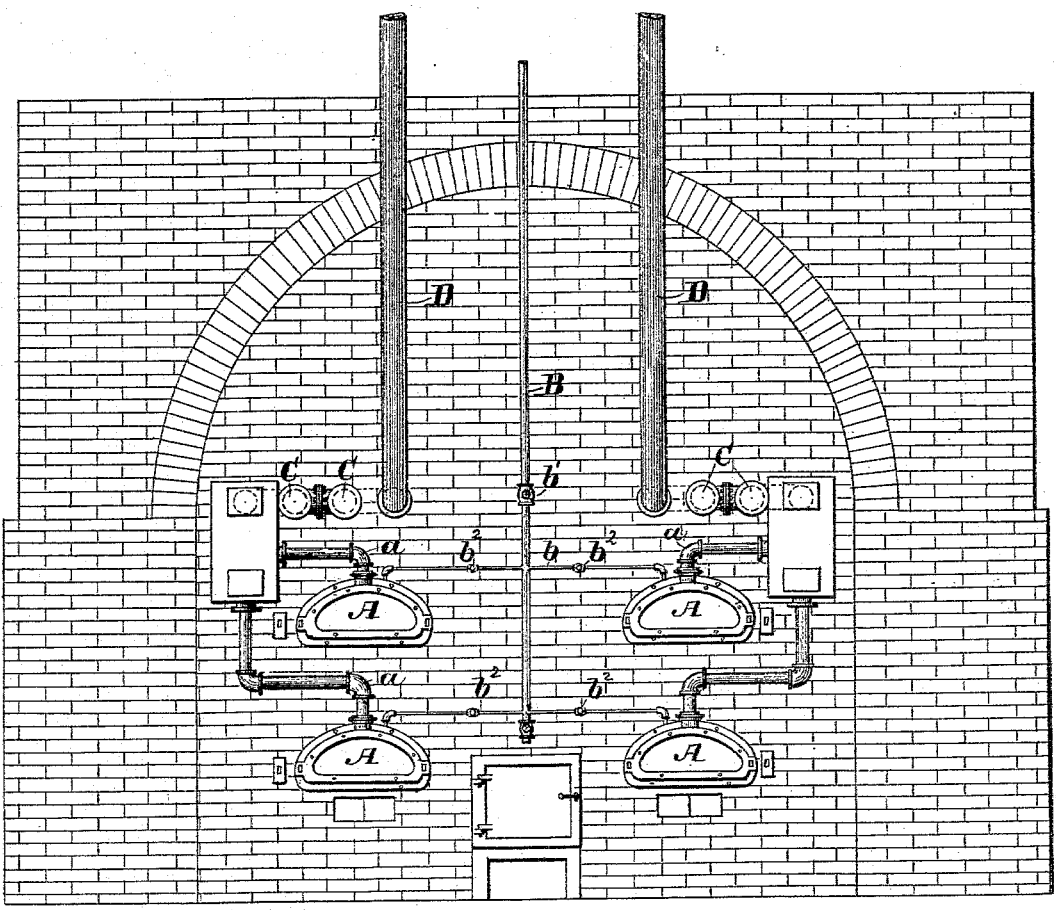
ATTEST—
J. Henry Kaiser
Harry L. Ames
INVENTOR.
William P. Lane,
By R. G. Dyrenforth,
his Attorney

UNITED STATES PATENT OFFICE.

WILLIAM P. LANE, OF PHILADELPHIA, PENNSYLVANIA, ASSIGNOR OF TWO-THIRDS TO ALEXANDER M. SUTHERLAND, OF ELIZABETH, NEW JERSEY, AND WILLIAM M. LANE, OF LANCASTER, PENNSYLVANIA.

PROCESS OF MANUFACTURING GAS.

SPECIFICATION forming part of Letters Patent No. 356,720, dated January 25, 1887.

Application filed August 20, 1886. Serial No. 211,419. (No specimens.)

*To all whom it may concern:*

Be it known that I, WILLIAM P. LANE, a citizen of the United States, residing at Philadelphia, in the county of Philadelphia and State of Pennsylvania, have invented certain new and useful Improvements in Processes of Manufacturing Gas; and I do hereby declare the following to be a full, clear, and exact description of the invention, such as will enable others skilled in the art to which it appertains to make and use the same.

This invention relates to the manufacture of illuminating-gas.

The object is to increase the yield of gas from a given quantity of gas-stock—such as the usual gas-coal—so that the production will be greater from a given quantity of gas-stock than has been possible in processes of producing gas heretofore, while the product will be equal to or better or richer in quality than gas made from a given quantity of stock heretofore.

It has been proposed to manufacture illuminating-gas by distilling the coal or other gas-stock with introduction of steam in a retort distinct and separate from that in which the gas-fixing is effected, and then passing the products of the distillation without condensation into a gas-fixing retort heated to a high temperature, in which they are transformed into illuminating-gas in the presence of metallic zinc or other material capable of absorbing and fixing the oxygen contained in the vapor of water, carbonic acid, and carbonic oxide at a high temperature, so that the vapor of water passing from the gas-stock during the operation of distillation is decomposed during the operation of gas-making, the oxygen being eliminated and fixed in a compound which cannot mix chemically with the illuminating-gas; but in such case it was deemed necessary to charge the fixing-retort or superheater with a substance or with substances for chemical effect, which substance or substances would of course undergo chemical change, which had to be removed and resupplied, and which were thus troublesome, besides being unnecessary.

The invention is also to be distinguished from those common operations in which a jet of superheated steam is fired into or upon incandescent coke, the resulting gas being then fixed.

My invention resides, essentially, in a process of producing illuminating-gas, which consists in subjecting gas-stock—such as the usual gas-making coal—in suitable retorts to the usual high temperature to which the retorts are subjected in the common process of manufacturing illuminating-gas, and, while the gas from the stock is being evolved in the ordinary manner, introducing water or wet steam into the retort, and then passing the commingled gas and vapors from the distilling retort or retorts to superheaters, either empty or containing a refractory substance capable of high heat and incapable of union with any of the constituents of the gas or vapors evolved, the purpose of the refractory material being to separate the commingled gas and vapor into finely-divided streams or portions—that is, thoroughly disintegrate and mix the mass, and subject it in small portions or bodies to a very high and a uniformly-high heat, whereby the commingled gas and vapors are thoroughly cooked and transformed into a fixed gas, utilizing so far as possible all the carbon and hydrogen which pass out from the distilling-retorts.

Any desired means for carrying the invention into effect may be employed; but by preference I employ the ordinary bench, having in addition suitable conduits for conveying water or steam to the distilling-retorts and superheaters and mixers.

In the accompanying drawing I have shown one form of apparatus by which my invention may be carried into effect. In the drawing the figure is an elevation showing an ordinary coal-gas bench provided with pipes for conducting water or steam to the retorts, and showing superheaters.

In the drawing the retorts are represented by the letter A, and are charged with a suitable gas-stock—such as the usual gas-making coal—and are subjected to the usual temperature at which coal is distilled dry in order to produce illuminating-gas.

B represents an inlet-pipe through which water or wet steam is admitted to the retorts, and branch pipes lead from this steam or water pipe to each retort with which the bench is provided.

The main pipe B has a cock, *b'*, and each of the branch pipes have cocks $b^2$, and by these cocks the inlet of water or steam may be regulated as desired and with accuracy. The commingled gases and vapors of water pass from the retorts A, through conduits $a$, to superheaters C, which may be provided with any desirable means for thoroughly mixing the mass of gas and vapors evolved from the stock in the retorts A to convert the mass into a permanently-fixed gas, which then passes up the stand-pipe D.

In brief, my invention may be said to consist in firing ordinary wet steam (or in dropping water) into a retort in which coal is being distilled in the ordinary manner, the watery vapors traversing and permeating the entire body of coal under process of distillation, and all the vapors that leave the retorts passing commingled into a cooking-retort, and there being fixed without the aid of any substance to unite chemically with any portion of the evolved mass into a permanent gas.

By reason of the great quantity of vapor of water present in the process of distillation a greater quantity of the oily constituents or heavy hydrocarbons is carried out from the distilling-retorts than is usual, and this vapor being also at first present in the fixing-retort or superheater the tar carried on is to a great extent dissolved, or presented in finely-divided portions with water, and is thus presented in a favorable condition for union with the hydrogen of the water vapors with its carbon and its hydrogen, thus increasing and enriching the yield of gas, and preventing accumulation of hard carbonaceous crust in the superheater.

It has been found in the practical application of my invention that the quantity of gas produced by the introduction of water or steam is much greater than that produced in the ordinary method of making gas, while the gas is of as good or of better quality than usual.

The addition of the water or steam is made, obviously, at a very slight expense, and it will be clear that the utilization of the great body of the tar is a great advantage. In addition it may be remarked that some lamp-black being formed in the fixing-retort, this is likewise of value.

Having thus fully described my invention, what I claim as new, and desire to secure by Letters Patent, is—

The process of manufacturing illuminating-gas, which consists in distilling a suitable gas-stock—such as the ordinary coal—in the usual manner, introducing water or wet steam to such gas-stock while undergoing distillation, and passing the commingled gas and vapors evolved to a highly-heated retort, either empty or containing a refractory substance incapable of union chemically with any of the constituents of the evolved mass from the distilling-retort, and there converting the commingled gas and vapors into a fixed and permanent gas, substantially as described.

In testimony whereof I affix my signature in presence of two witnesses.

WM. P. LANE.

Witnesses:
DAVID H. MEAD,
L. W. HARRIS.